June 28, 1955  W. M. POLLOCK  2,711,937
BALL BEARING MOUNTING FOR FORM ROLLERS
Filed July 10, 1950  2 Sheets-Sheet 1
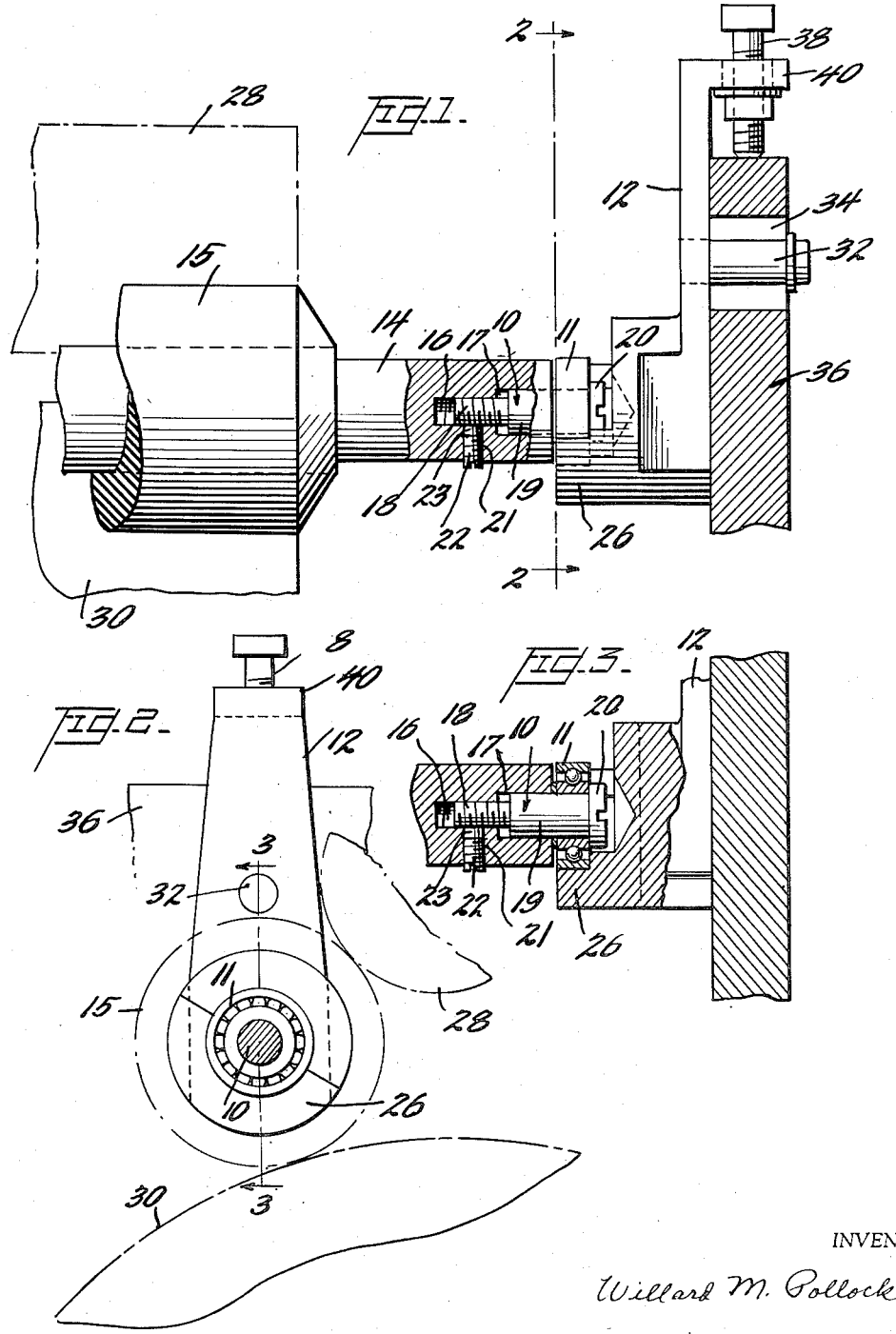
INVENTOR
Willard M. Pollock
BY Watson, Cole, Grindle & Watson
ATTORNEY

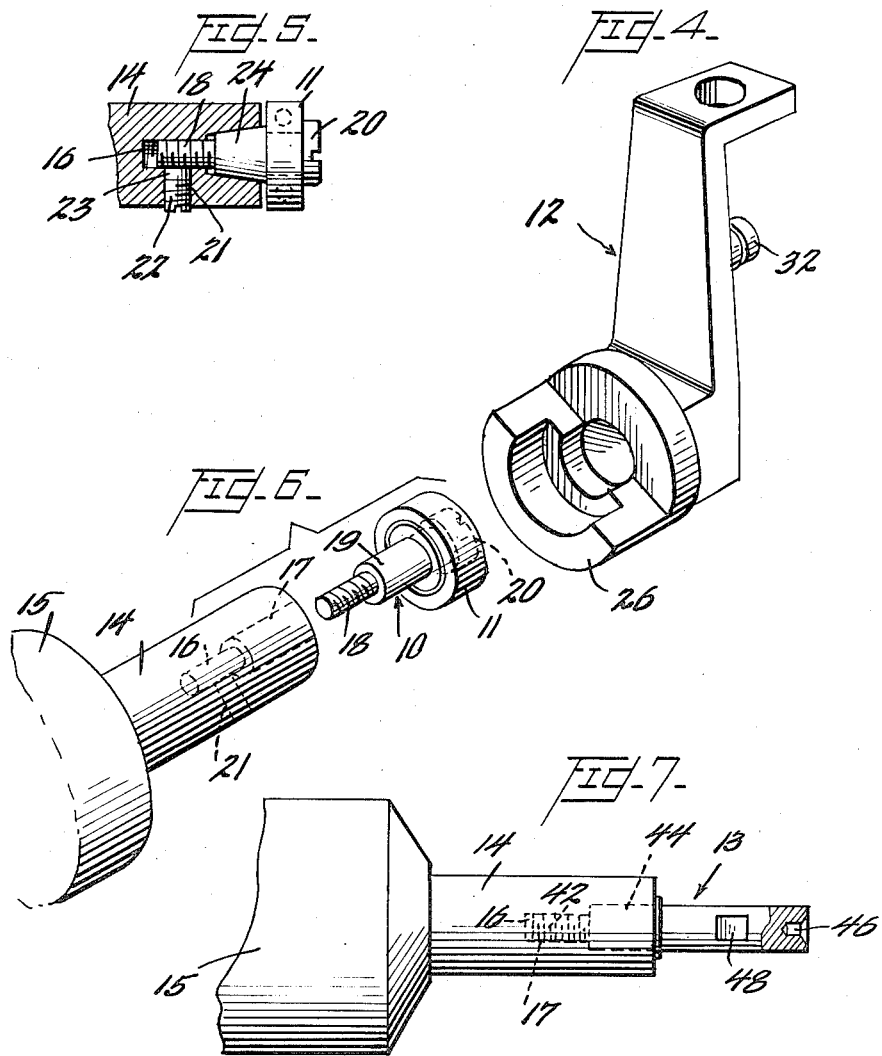

United States Patent Office 2,711,937
Patented June 28, 1955

2,711,937

BALL BEARING MOUNTING FOR FORM ROLLERS

Willard M. Pollock, Short Hills, N. J., assignor to American Type Founders, Inc., a corporation of New Jersey Application July 10, 1950, Serial No. 172,809

3 Claims. (Cl. 308—189)

This invention relates to form rollers for use on offset presses and particularly to means for supporting such a roller in operative position on the frame of such a press.

The well known form roller which has long been employed as an essential element of the conventional offset press normally bears a cylindrical covering fabricated of rubber or a rubber-like substance and this covering wears, in the normal operation of the press, at a fairly rapid rate. By reason of the wearing away of the covering it is rather frequently necessary to remove the roller from the press, take off the worn cover, substitute therefor a new covering, and replace the roller upon the press. This operation must be carried out at rather frequent intervals and each time the roller is re-covered it is exposed to substantial danger of mechanical injury. The roller shaft itself is sturdy and not readily damaged but the shaft ends, which are sometimes provided with journals and sometimes provided with roller bearings, are frequently injured by striking solid objects of one kind or another.

Where roller bearings are utilized to support the shaft in operative position in the press, and it is desirable to employ roller bearings for this purpose, the danger of injury to the assembly is increased, the roller bearings being commonly mounted upon the extreme ends of the form roller shaft and encircling that shaft and thus comprising prominent projections easily damaged. Removal and replacement of such roller bearings as a preliminary to each cover replacing operation has been suggested and practiced but such bearing removal operations not only involve considerable increase in the total cost of replacing the covering of the roll but likewise shorten the life of the roll since the operations of forcing the bearings on and off of the roll ends are in themselves likely to cause damage to either the bearings, or the roll end surfaces, or both. When a bearing is so damaged as to need replacement the overall cost of maintenance of the form roller is, of course, considerably increased.

It is the purpose of the invention to provide an improved form roller assembly including, in association with the shaft, ball bearings for supporting it at its ends and means for separably mounting the ball bearings upon the shaft in such manner that these bearings may be readily removed as a preliminary step in an operation involving the removal and replacement of the roll cover, and may be as readily replaced after the roll covering operation has been completed and prior to replacement of the assembly on a press.

In accordance with the invention the anti-friction bearings which are hereafter called "roller bearings," but may be either roller or ball bearings or other suitable anti-friction bearings involving the use of inner and outer races with intermediate anti-friction elements, are positioned beyond the ends of the shaft and are relatively small in diameter. Associated with each bearing is a stud, the stud comprising essentially a cylindrical member which is pressed into the inner ball race of the bearing and, in effect, becomes an integral part of the bearing inner ball race, the stud projecting laterally or axially of the bearing and this laterally projecting portion being preferably cylindrical. Each end of the form roller shaft is provided with a cylindrical recess and the roller studs are adapted to extend into these recesses, the inner wall of the recess being preferably threaded and the outer surface of the stud being also preferably threaded to engage the first mentioned threads so that, after the stud has been applied to the shaft, it is securely held. Auxiliary means may be associated with the shaft to prevent relative rotation of stud and shaft and thus eliminate the possibility that the stud may accidentally turn with respect to the shaft and become loose.

There is also preferably employed, in association with each end of the form roller shaft, a pin or spindle-like element which may be inserted into the recess in the associated end of the shaft when the roller supporting stud has been removed, the two pins at the shaft ends comprising journals for supporting the shaft in a suitable jig or frame during the cover removing or replacing operation. After such operation has been completed the pins are removed and the roller supporting studs positioned.

It will be appreciated that the precise details of the anti-friction bearing supporting means may be varied without departure from the invention, that form of means for separably attaching to the shaft ends the roller bearings to be employed as shaft supporting elements being set forth by way of example only.

In the drawings:

Figure 1 is a front elevational view showing a fragment of a form roller, one end of the form roller shaft on which a roller bearing bearing is supported, a bearing bracket, and a fragment of the press frame to which the bearing bracket is fixed, the shaft being shown partially in section to illustrate more clearly one aspect of the invention;

Figure 2 is a view taken along the lines 2—2 of Figure 1;

Figure 3 is a vertical sectional view taken along line 3—3 of Figure 2;

Figure 4 is a perspective view of the lower portion of a bearing bracket which is constructed to receive a bearing of the type shown in the foregoing figures;

Figure 5 is a vertical sectional view, similar in part to that shown in Figure 3, illustrating a modified form of bearing stud;

Figure 6 is a perspective view showing the manner in which the bearing shown therein is assembled on a bearing stud and one end of a roller shaft adapted to receive the stud; and Figure 7 is a side elevational view, partly in section, of a roller shaft and a dummy pin suitable for replacing the bearing stud in the ends of the form roller shaft when the form roller is removed from the press for repair.

In general, the instant roller bearing supporting means for the ends of a roller shaft comprises a means associated with each bearing for detachably securing the bearing to an end of the shaft. This latter means includes a member 10 (Figures 1, 3 and 6) which is rigidly attached to the inner race of a roller bearing 11 and which is adapted to connect the bearing to the roller shaft. This member and the shaft are formed with mutually interlocking, separable portions which when interlocked support the form roller shaft in coaxial relationship with the roller bearing. A pair of adjustable brackets or bearing hangers 12 (Figures 1, 2 and 3) are fixed on frame elements of the press to either side of the form roller in position to receive the roller bearings. The hangers are constructed so that the roller, including the bearings, may be easily removed from the press. The member 10 carrying the bearing may then be removed from the roller shaft or replaced at will. A second member 13 (Figure 7) is provided which may be similarly interlocked with the shaft when the bearing supporting member has been removed. This second member is also arranged to support the form roller shaft in coaxial relationship with the member 13, and thus provide a means for conveniently handling the roller during repair work, as for example, supporting the roller in a lathe during grinding and finishing operations thereon.

In the drawings, wherein an adaptation of the instant invention to a form roller of an offset printing press is shown, 14 indicates a roller shaft on which a rubber covering 15 is formed so that the circumferential surface of the covering is coaxial with the shaft 14. The end portions of the shaft extend beyond the covering positioned centrally thereon. These end portions of the shaft are provided with an axially positioned aperture which may be formed by counterboring the ends of the shaft. As illustrated in Figure 6, the inner portion of aperture 16 may be of smaller diameter than the portion 17 (which is provided with a smooth bore). The member or bearing stud 10 is adapted to be received in the axial aperture; a screw threaded extension 18 thereof threadingly engaging the inner portion 16 of the aperture, and a cylindrical portion 19 snugly fitting into the smooth bored portion 17 of the aperture.

The roller bearing 11 is press fit onto the cylindrical surface of the bearing stud so that one lateral edge of the inner race of the bearing bears against the head flange 20. The bearing and bearing stud, which remain permanently assembled as shown in Figure 6, may then be rigidly connected to the form roller shaft by screwing the bearing stud into the axial aperture in the shaft. The bearing is thus assembled in coaxial relationship with the shaft and the form roller covering.

A means for locking the bearing stud in its assembled position includes a radially disposed aperture 21 (Figure 6) which at its inner end opens into the screw threaded portion of the axial aperture in the shaft end. The aperture 21 is threaded to receive a set screw 22. A soft metal shoe 23 may be inserted ahead of the set screw and forced into engagement with the bearing stud to lock the stud against movement relative to the shaft 14.

A modification of the bearing stud is shown in Figure 5. There shown is a stud which is provided with a truncated conical section 24 intermediate the threaded end portion 18 and the cylindrical portion on which the inner race of the bearing is fixed proximate the head 20. The axial aperture in the shaft associated with this stud is provided with a correspondingly tapered section intermediate the threaded portion 16 and the end face of the shaft. This construction ensures minutely acute positioning of the bearing in coaxial relationship with the form roller shaft.

A pair of brackets or bearing hangers 12 are fixed to frame elements of the press in position on either side of the roller to receive the bearings 11. The lower end of each hanger is provided with a horizontally disposed semi-cylindrical hub 26 which is recessed on its flat side to provide a concave surface faced generally upward. The outer race of the bearing is received in this recessed portion of the hub.

The bearing is retained in the hanger by the weight of the form roller assembly and by the downward force applied to the form roller by a backing roller 28 such as illustrated in Figures 1 and 2. The angular position of the recessed hub 26 on the lower end of the hanger is selected so that the force applied to the form roller by the backing roller will firmly retain the bearing in the recess, and so that the roller, including the bearing, may be conveniently removed from its operative position without interference from other elements of the press.

Each of the hangers 12 is adjustably supported so that the form roller supported thereby may be adjusted with respect to the position of the backing roller 28 and the printing cylinder 30 which are both maintained in rolling engagement with the form roller during normal operation of the press.

A pin 32 projecting from the outwardly facing side of the shank of the hanger is received in a vertically elongated slot 34 formed in the frame element 36. This pin and slot connection between the frame and the hanger permits the hanger to be adjusted generally vertically with respect to the frame. The adjusting means comprises an adjusting screw 38 which threadedly engages an aperture in the flanged end 40 of the hanger which is turned to lie parallel to a flat surface of the frame element 36.

The lower end of the adjusting screw abuts this flat surface, so that rotation of the screw will cause a vertical movement of the hanger relative to the frame of the press.

It will be apparent that several rollers may be supported in a single machine so that a single backing roller will aid in retaining a plurality of form rollers in their bearing supports.

In Figure 7 is illustrated a dummy pin which is adapted to be received in the axial aperture of the form roller shaft shown in Figure 1 after the bearing supporting stud has been removed therefrom to avoid injuries to the bearing when repairs are being made on the form roller. One end of the dummy pin is provided with a thread portion 42, and a cylindrical portion 44 which are received, respectively, in portions 16 and 17 of the axial aperture. The end face of the opposite end of the pin is provided with an axially centered conical recess 46 so that the pin may be used to support the roller in a lathe. Spaced, circumferentially aligned portions of the shaft surface are wrench flattened to provide grips 48 which facilitate inserting and withdrawing the pin.

Having thus described the invention what I claim as new and desire to secure by Letters Patent is:

1. A printing press roll assembly adapted for ready installation and removal from the press; said assembly comprising the roll proper, an axial shaft extending at least through an end portion of the roll, an axial recess in the outer end of said shaft, and an anti-friction bearing sub-assembly having inner and outer races and anti-friction elements therebetween; said sub-assembly adapted to support the shaft from the printing press for rapid rotation during printing, said bearing sub-assembly including a stud fixed to and projecting axially from said inner race and entering said recess in the shaft, and means for securing said stud rigidly in said recess for supporting said shaft for rotation, said bearing sub-assembly, including the outer race, being of substantially the same diameter as the end of the shaft and disposed so closely to the end of said shaft as to preclude the interposition of any element or parts between them, and thus preventing any necessity for the removal of the bearing sub-assembly from the shaft before the whole roll assembly is removed from the press.

2. A printing press roll assembly adapted for ready installation and removal from the press; said assembly comprising the roll proper, an axial shaft extending at least through an end portion of the roll, an axial recess in the outer end of said shaft, an anti-friction bearing sub-assembly having inner and outer races and anti-friction elements therebetween; said sub-assembly adapted to support the shaft from the printing press for rapid rotation during printing, said bearing sub-assembly including a stud fixed to and projecting axially from said inner race and entering said recess in the shaft, the stud having a smooth cylindrical portion fitting snugly within a cylindrical outwardly disposed portion of the recess, and an attenuated threaded end portion screwed into a similarly threaded attenuated inward portion of the recess, and a set screw threaded radially through the shaft and into abutment with the threaded portion of the stud.

3. A printing press roll assembly particularly of the type requiring periodic repair or recovering, adapted for ready installation and removal from the press as well as temporary disposal in a renovating support; said assembly comprising the roll proper, an axial shaft extending at least through an end portion of the roll, and journalling means associated with the outer end of said shaft and comprising the sole means for rotatably supporting the said end portion of the roll, said journalling means comprising a unitary gudgeon member having at one of its ends means for rotatably supporting it in one of the stated roll utilizing instrumentalities, and a compound differential-diameter portion at its other end adapted to be inserted into a recess in said end of the shaft, a compound differential-diameter axial recess in said shaft and adapted to receive the second named end of the gudgeon member, said recess comprising two portions only, a smooth-walled outer portion and an internally threaded inner portion; said differential-diameter end portion of said gudgeon being rigidly formed to provide a fixed shoulder between the two portions, the extreme outer portion of that end of said gudgeon member being threaded so as to be screwed into the inner threaded portion of said recess, and the other portion being smooth walled to be snugly received within the outer larger portion of the recess, the outwardly projecting end of the gudgeon member adapted to receive a tool for rotating it relative to the rolled shaft whereby the unitary gudgeon member may be removed from the recess in its entirety by a single operation.

References Cited in the file of this patent

UNITED STATES PATENTS

| | | |
|---|---|---|
| 464,568 | Johnson | Dec. 8, 1891 |
| 2,090,939 | Crafts et al. | Aug. 24, 1937 |
| 2,190,336 | Olson | Feb. 13, 1940 |

FOREIGN PATENTS

| | | |
|---|---|---|
| 360,061 | Germany | Sept. 29, 1922 |
| 433,214 | Great Britain | Aug. 12, 1935 |